(12) United States Patent
Allen et al.

(10) Patent No.: US 11,176,463 B2
(45) Date of Patent: *Nov. 16, 2021

(54) AUTOMATING TABLE-BASED GROUNDTRUTH GENERATION

(71) Applicant: International Business Machines Corporation, Armonk, NY (US)

(72) Inventors: Corville O. Allen, Morrisville, NC (US); Anne E. Gattiker, Austin, TX (US); Joseph N. Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 752 days.

This patent is subject to a terminal disclaimer.

(21) Appl. No.: 15/369,847

(22) Filed: Dec. 5, 2016

(65) Prior Publication Data

US 2018/0157990 A1 Jun. 7, 2018

(51) Int. Cl.
*G06N 5/04* (2006.01)
*G06F 16/22* (2019.01)
*G06F 16/9535* (2019.01)

(52) U.S. Cl.
CPC ........... *G06N 5/04* (2013.01); *G06F 16/2282* (2019.01); *G06F 16/9535* (2019.01)

(58) Field of Classification Search
CPC ...................................................... G06N 5/04
USPC ......................................................... 706/11
See application file for complete search history.

(56) References Cited

U.S. PATENT DOCUMENTS

| | | |
|---|---|---|
| 8,412,514 B1 | 4/2013 | Feng et al. |
| 8,768,925 B2 * | 7/2014 | Brown ................ G06F 16/3329 707/736 |
| 8,819,007 B2 * | 8/2014 | Brown ...................... F16H 3/54 707/731 |
| 8,898,159 B2 * | 11/2014 | Brown ................ G06F 16/3329 707/730 |
| 8,909,648 B2 | 12/2014 | El-Yaniv et al. |
| 9,063,975 B2 | 6/2015 | Isensee et al. |
| 9,286,290 B2 | 3/2016 | Allen et al. |
| 9,916,348 B1 * | 3/2018 | Madhavan ........ G06F 16/24578 |
| 2006/0259861 A1 | 11/2006 | Watson |
| 2009/0112828 A1 | 4/2009 | Rozenblatt |
| 2010/0191686 A1 | 7/2010 | Wang et al. |
| 2011/0125734 A1 * | 5/2011 | Duboue ................... G09B 7/00 707/723 |

(Continued)

OTHER PUBLICATIONS

Jauhar et al. "Tables as Semi-structured Knowledge for Question Answering", Aug. 2016, Association for Computational Linguistics, p. 474-483. (Year: 2016).*

(Continued)

*Primary Examiner* — Hien D Khuu
(74) *Attorney, Agent, or Firm* — Terrile, Cannatti & Chambers, LLP; Stephen A. Terrile

(57) ABSTRACT

A method, system and computer-usable medium are disclosed for using table-based groundtruth to train a question-answer (QA) system, comprising: receiving a corpus of text comprising unstructured text and a table; performing QA pair generation operations on the unstructured text and the table to generate QA pairs, the QA pairs being based upon information obtained from the table; assigning a score to each QA pair, the score corresponding to an indicator of user interest.

5 Claims, 7 Drawing Sheets

(56) References Cited

U.S. PATENT DOCUMENTS

| | | | |
|---|---|---|---|
| 2013/0007033 A1* | 1/2013 | Brown | G06N 5/02 707/764 |
| 2014/0258286 A1* | 9/2014 | Brown | G06F 16/3329 707/728 |
| 2014/0278358 A1 | 9/2014 | Byron et al. | |
| 2014/0297571 A1 | 10/2014 | Beamon et al. | |
| 2015/0074095 A1 | 3/2015 | Enders et al. | |
| 2015/0142418 A1 | 5/2015 | Byron et al. | |
| 2015/0142851 A1 | 5/2015 | Gupta et al. | |
| 2015/0169395 A1 | 6/2015 | Giffels et al. | |
| 2015/0169544 A1* | 6/2015 | Bufe, III | G06N 5/02 704/9 |
| 2015/0169545 A1 | 6/2015 | Eisen | |
| 2015/0178623 A1 | 6/2015 | Balani et al. | |
| 2015/0363382 A1 | 12/2015 | Bohra et al. | |
| 2016/0180242 A1* | 6/2016 | Byron | G06N 5/041 706/11 |
| 2017/0060945 A1* | 3/2017 | Bastide | G06F 16/24542 |

OTHER PUBLICATIONS

Sun et al., "Table Cell Search for Question Answering", Apr. 2016, IW3C2, p. 771-782. (Year: 2016).*
Anonymous, ip.com, Extensible Method for Criteria-Driven Answer Scoring in a Deep Question Answering System ip.com Prior Art Database Technical Disclosure (2014) IPCOM000239037D, published Oct. 2, 2014.
Ali et al., "Automatic Question Generation from Sentences," TALN, Montreal Jul. 19-23, 2010, http://www.sadidhasan.com/sadid-TALN.pdf.
Wolfe, J H., "Automatic Question Generation From Text—An Aid to Independent Study," ACM SIGCSE Bulletin 8(1): 104-112, Feb. 1976.
Wang et al., "Automatic Question Generation for Learning Evaluation in Medicine," H. Leung et al. (Eds ): ICWL 2007, LNCS 4823, pp. 242-251, 2008.
Chambers et al., "Template-Based Information Extraction without the Templates," Proceedings of the 49th Annual Meeting of the Association for Computational Linguistics, 2011, pp. 976-986.
Kuyten et al., "Fully Automated Generation of Question-Answer Pairs for Scripted Virtual Instruction," Lecture Notes in Computer Science,vol. 7502, pp. 1-14.
Awad et al., "Automatic Generation of Question Bank Based on Pre-defined Templates," Int'l Journal of Innovations & Advancement in Computer Science, vol. 3, Issue 1, Apr. 2014.

Kotov et al., "Towards Natural Question-Guided Search," World Wide Web Conference, 2010, http://sifaka.cs.uiuc.edu/czhai/pub/www10-quse.pdf.
Heilman et al., "Good Question! Statistical Ranking for Question Generation," HLT '10 Human Language Technologies: The 2010 Annual Conference of the North American Chapter of the Association for Computational Linguistics, May 2010, Los Angeles, CA, pp. 609-617.
Heilman, Michael, "Automatic Factual Question Generation From Text," Ph D. thesis, 2011, http://www.cs.cmu.edu/~ark/mheilman/questions/papers/heilman-question-generation-dissertation.pdf.
Fader et al., "Paraphrase-Driven Learning for Open Question Answering," The 51st Annual Meeting of the Association for Computational Linguistics, 2013.
Govindaraju et al., "Understanding Tables in Context Using Standard NLP Toolkits," Proceeding of 51st Annual Meeting of the Assoc. for Computational Linguistics (ACL), 2013. http://cs.stanford.edu/people/chrismre/papers/jointable-acl.pdf.
Dalvi et al., "WebSets: Extracting Sets of Entities from the Web Using Unsupervised Information Extraction," WSDM 2012, http://www.cs.cmu.edu/~wcohen/postscript/wsdm-2012-bdd.pdf.
Zheng et al., "K2Q: Generating Natural Language Questions from Keywords with User Refinements," Proc. of the 5th International Conference on Natural Language Processing, pp. 947-955, 2011 http://static.googleusercontent.com/media/research.google.com//pubs/archive/37566.pdf.
Chali et al., "Towards Automatic Topical Question Generation," Proceedings of the 24th International Conference on Computational Linguistics (COLING 2012), pp. 475-492.
Chali et al., "Towards Topic-to-Question Generation," Association for Computational Linguistics, vol. 41, No. 1 (COLING 2015).
Georg et al., "Visualizing the Importance of Medical Recommendations with Conversational Agents," DOI 10.1007/978-3-540-85483-8_39 Conference: Proc. of 8th International Conference on Intelligent Virtual Agents (IVA 2008), http://gersende.georg.free.fr/IVA2008.pdf.
Xu et al., Automatic Question Generation and Answer Judging: A Q&A Game for Language Learning, 2009 https://groups.csail.mit.edu/sls/publications/2009/SIGSLaTE09_Xu.pdf.
High, R., "The Era of Cognitive Systems: An Inside Look at IBM Watson and How it Works," IBM Redbooks, 2012.
Yuan et al., "Watson and Healthcare," IBM developerWorks, 2011. IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
Beason et al., U.S. Appl. No. 14/810,723, filed Jul. 28, 15, entitled Domain-Specific Question-Answer Pair Generation.
List of IBM Patents or Applications Treated as Related.

* cited by examiner

| Demographic | Non-Inflammatory Control (C) | Psoriatic (P) | Mild Psoriasis At Peak (MP) | Severe Psoriasis At Peak (SP) | p-value For C vs. P | p-value For MP vs. SP |
|---|---|---|---|---|---|---|
| Number (N) | 205 | 409 | 203 | 206 | | |
| Age, yr. mean (SD) | 11.5 (3.8) | 12.2 (3.6) | 11.8 (3.6) | 12.5 (3.6) | 0.974 | 0.862 |
| Male, No. (%) | 96 (46.8) | 178 (43.5) | 84 (41.4) | 94 (45.9) | 0.218 | 0.771 |
| Duration of psoriasis, year median (interquartile range) | | 4 (2,8) | 4 (2,7) | 5 (2,8) | | 0.780 |
| Race, No. (%) | | | | | 0.477 | 0.528 |
| White (non Hispanic) | 156 (76.1) | 247 (60.5) | 134 (66.0) | 113 (55.1) | | |
| Asian | 18 (8.8) | 84 (20.5) | 33 (16.3) | 51 (24.6) | | |
| Hispanic or Latino | 19 (9.3) | 46 (11.2) | 20 (9.9) | 26 (12.3) | | |
| Black / AA | 8 (3.9) | 13 (3.2) | 5 (2.5) | 8 (3.9) | | |
| Other | 4 (2.0) | 19 (4.6) | 11 (5.4) | 8 (3.9) | | |
| Continent, No. (%) | | | | | 0.979 | 0.892 |
| Americas | 108 (52.7) | 200 (48.8) | 89 (43.8) | 111 (53.6) | | |
| Europe | 87 (42.4) | 148 (36.1) | 90 (44.3) | 58 (28.0) | | |
| Asia | 10 (4.9) | 62 (15.1) | 24 (11.8) | 38 (18.4) | | |
| Other Characteristics, No. (%) | | | | | | |
| Psoriatic Arthritis | --- | 23 (5.6) | 7 (3.5) | 16 (7.7) | --- | 0.722 |
| Phototherapy | --- | 88 (21.8) | 18 (8.9) | 70 (34.8) | --- | < 0.001 |
| Systemic Medications | --- | 104 (25.7) | 22 (10.8) | 82 (40.8) | --- | < 0.001 |
| Family History, No. (%) | | | | | | |
| Diabetes | 66 (41.8) | 153 (48.1) | 66 (44.0) | 87 (51.8) | 0.249 | 0.716 |
| Hypertension | 83 (52.5) | 165 (52.2) | 77 (51.3) | 88 (53.0) | 0.952 | 0.188 |
| Hyperlipidemia | 77 (48.7) | 115 (36.2) | 53 (35.3) | 62 (36.9) | 0.656 | 0.684 |
| Obesity | 48 (30.4) | 94 (29.6) | 37 (24.7) | 57 (33.9) | 0.610 | 0.705 |
| Psoriatic Arthritis | --- | 21 (6.6) | 5 (3.3) | 16 (9.5) | --- | 0.757 |
| Psoriasis, Extended Family | --- | 213 (52.0) | 97 (47.8) | 116 (56.0) | --- | 0.167 |
| Psoriasis, Extended Family | --- | 118 (28.9) | 56 (27.6) | 62 (30.1) | --- | 0.890 |

FIGURE 4

AUTOMATING TABLE-BASED GROUNDTRUTH GENERATION

BACKGROUND OF THE INVENTION

Field of the Invention

The present invention relates in general to the field of computers and similar technologies, and in particular to software utilized in this field. More particularly, it relates to a method, system and computer-usable medium for improved coverage of tables in a corpus when generating question-answer (QA) pairs used to train a QA system.

Description of the Related Art

Current implementations of question-answer (QA) systems are primarily oriented towards processing unstructured text within a corpus to provide answers to a given question. The veracity of such answers is often dependent upon the groundtruth (i.e., questions with identified correct answers) used to train the QA system. While such approaches can be effective in providing qualitative answers, they typically are less effective in providing quantitative answers (e.g., numerical, categorical, percentage, date, time, etc.) unless such information is already present within the unstructured text.

More often, quantitative information is instead provided as structured data in a tabular format, such as a table or a set of bulleted items. The veracity of answers to questions on such structured content is also often dependent upon the groundtruth (i.e., question with identified correct answers) used to train the QA system.

However, known approaches for generating training QA pairs based on structured data have limitations. As an example, generating all possible questions from repeated-structure content, such as that commonly found in a table, may result in a plethora of QA pairs that may not be of significant interest to a user. As a result, providing groundtruth (i.e., questions with identified correct answers) for data stored in tables can prove challenging, and by extension, negatively affect QA system training.

SUMMARY OF THE INVENTION

A method, system and computer-usable medium are disclosed for using table-based groundtruth to train a question-answer (QA) system, comprising: receiving a corpus of text comprising unstructured text and a table; performing QA pair generation operations on the unstructured text and the table to generate QA pairs, the QA pairs being based upon information obtained from the table; assigning a score to each QA pair, the score corresponding to an indicator of user interest.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 is an exemplary table used in automating the generation of table-based groundtruths.

DETAILED DESCRIPTION

Figure 1:
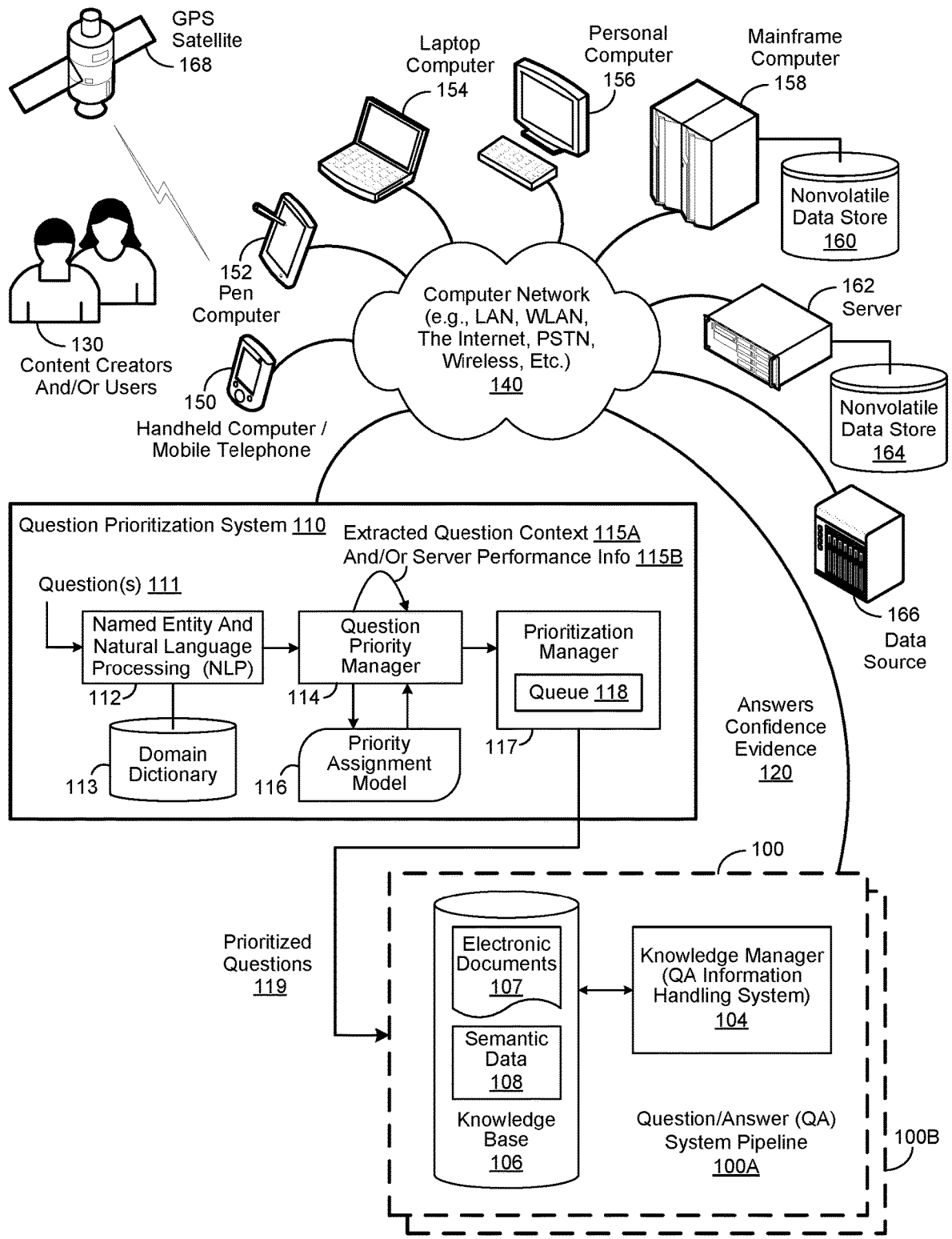
FIG. 1 depicts an exemplary client computer in which the present invention may be implemented.

A method, system and computer-usable medium are disclosed for improved coverage of tables in a corpus when generating question-answer (QA) pairs used to train a QA system. The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium, or media, having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 and a question prioritization system 110 connected to a computer network 140. The QA system 100 includes a knowledge manager 104 that is connected to a knowledge base 106 and configured to provide question/answer (QA) generation functionality for one or more content creators and/or users 130 who submit across the network 140 to the QA system 100. To assist with efficient sorting and presentation of questions to the QA system 100, the question prioritization system 110 may be connected to the computer network 140 to receive user questions, and may include a plurality of subsystems which interact with cognitive systems, like the QA system 100, to prioritize questions or requests being submitted to the QA system 100.

The Named Entity subsystem 112 receives and processes each question 111 by using natural language processing (NLP) to analyze each question and extract question topic information contained in the question, such as named entities, phrases, urgent terms, and/or other specified terms which are stored in one or more domain entity dictionaries 113. By leveraging a plurality of pluggable domain dictionaries 113 relating to different domains or areas (e.g., travel, healthcare, electronics, game shows, financial services, etc.), the domain dictionary 113 enables critical and urgent words (e.g., "threat level") from different domains (e.g., "travel") to be identified in each question based on their presence in the domain dictionary 113. To this end, the Named Entity subsystem 112 may use an NLP routine to identify the question topic information in each question. As used herein, "NLP" broadly refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 113.

The Question Priority Manager subsystem 114 performs additional processing on each question to extract question context information 115A. In addition, or in the alternative, the Question Priority Manager subsystem 114 may also extract server performance information 115B for the question prioritization system 110 and/or QA system 100. In selected embodiments, the extracted question context information 115A may include data that identifies the user context and location when the question was submitted or received. For example, the extracted question context information 115A may include data that identifies the user who submitted the question (e.g., through login credentials), the device or computer which sent the question, the channel over which the question was submitted, or any combination thereof. Other examples may include the location of the user or device that sent the question, any special interest location indicator (e.g., hospital, public-safety answering point, etc.), other context-related data for the question, or any combination thereof. In certain embodiments, the location information is determined through the use of a Geographical Positioning System (GPS) satellite 168. In these embodiments, a handheld computer or mobile telephone 150, or other device, uses signals transmitted by the GPS satellite 168 to generate location information, which in turn is provided via the computer network 140 to the Question Priority Manager subsystem 114 for processing.

In various embodiments, the source for the extracted context information 115A may be a data source 166 accessed through the computer network 140. Examples of a data source 166 include systems that provide telemetry information, such as medical information collected from medical equipment used to monitor a patient's health, environment information collected from a facilities management system, or traffic flow information collected from a transportation monitoring system. In certain embodiments, the data source 166 may be a storage area network (SAN) or other network-based repositories of data.

In various embodiments, the data source 166 may provide data directly or indirectly collected from "big data" sources. In general, big data refers to a collection of datasets so large and complex that traditional database management tools and data processing approaches are inadequate. These datasets can originate from a wide variety of sources, including computer systems (e.g., 156, 158, 162), mobile devices (e.g., 150, 152, 154), financial transactions, streaming media, social media, as well as systems (e.g., 166) commonly associated with a wide variety of facilities and infrastructure (e.g., buildings, factories, transportation systems, power grids, pipelines, etc.). Big data, which is typically a combination of structured, unstructured, and semi-structured data poses multiple challenges, including its capture, curation, storage, transfer, search, querying, sharing, analysis and visualization.

The Question Priority Manager subsystem 114 may also determine or extract selected server performance data 115B for the processing of each question. In certain embodiments, the server performance information 115B may include operational metric data relating to the available processing resources at the question prioritization system 110 and/or QA system 100, such as operational or run-time data, CPU utilization data, available disk space data, bandwidth utilization data, and so forth. As part of the extracted information 115A/B, the Question Priority Manager subsystem 114 may identify the Service Level Agreement (SLA) or Quality of Service (QoS) processing requirements that apply to the question being analyzed, the history of analysis and feedback for the question or submitting user, and the like. Using the question topic information and extracted question context 115A and/or server performance information 115B, the Question Priority Manager subsystem 114 is configured to populate feature values for the Priority Assignment Model 116. In various embodiments, the Priority Assignment Model 116 provides a machine learning predictive model for generating target priority values for the question, such as by using an artificial intelligence (AI) approaches known to those of skill in the art. In certain embodiments, the AI logic is used to determine and assign a question urgency value to each question for purposes of prioritizing the response processing of each question by the QA system 100.

The Prioritization Manager subsystem 117 performs additional sort or rank processing to organize the received questions based on at least the associated target priority values such that high priority questions are put to the front of a prioritized question queue 118 for output as prioritized questions 119. In the question queue 118 of the Prioritization Manager subsystem 117, the highest priority question is placed at the front of the queue for delivery to the assigned QA system 100. In selected embodiments, the prioritized questions 119 from the Prioritization Manager subsystem 117 that have a specified target priority value may be assigned to a particular pipeline (e.g., QA system pipeline 100A, 100B) in the QA system 100. As will be appreciated, the Prioritization Manager subsystem 117 may use the question queue 118 as a message queue to provide an asynchronous communications protocol for delivering prioritized questions 119 to the QA system 100. Consequently, the Prioritization Manager subsystem 117 and QA system 100 do not need to interact with a question queue 118 at the same time by storing prioritized questions in the question queue 118 until the QA system 100 retrieves them. In this way, a wider asynchronous network supports the passing of prioritized questions 119 as messages between different QA system pipelines 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 117 may be configured to convert oversubscribing questions into asynchronous responses, even if they were asked in a synchronized fashion.

The QA system 100 may include one or more QA system pipelines 100A, 100B, each of which includes a computing device 104 comprising one or more processors and one or more memories. The QA system pipelines 100A, 100B may likewise include potentially any other computing device elements generally known in the art including buses, storage devices, communication interfaces, and the like. In various embodiments, these computing device elements may be implemented to process questions received over the network 140 from one or more content creator and/or users 130 at computing devices (e.g., 150, 152, 154, 156, 158, 162). In certain embodiments, the one or more content creator and/or users 130 are connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users 130. Other embodiments of QA system 100 may be used with components, systems, sub-systems, and/or devices other than those that are depicted herein.

In each QA system pipeline 100A, 100B, a prioritized question 119 is received and prioritized for processing to generate an answer 120. In sequence, prioritized questions 119 are de-queued from the shared question queue 118, from which they are de-queued by the pipeline instances for processing in priority order rather than insertion order. In selected embodiments, the question queue 118 may be implemented based on a "priority heap" data structure. During processing within a QA system pipeline (e.g., 100A, 100B), questions may be split into multiple subtasks, which run concurrently. In various embodiments, a single pipeline instance may process a number of questions concurrently, but only a certain number of subtasks. In addition, each QA system pipeline 100A, 100B may include a prioritized queue (not shown) to manage the processing order of these subtasks, with the top-level priority corresponding to the time that the corresponding question started (i.e., earliest has highest priority). However, it will be appreciated that such internal prioritization within each QA system pipeline 100A, 100B may be augmented by the external target priority values generated for each question by the Question Priority Manager subsystem 114 to take precedence, or ranking priority, over the question start time. In this way, more important or higher priority questions can "fast track" through a QA system pipeline 100A, 100B if it is busy with already-running questions.

In the QA system 100, the knowledge manager 104 may be configured to receive inputs from various sources. For example, knowledge manager 104 may receive input from the question prioritization system 110, network 140, a knowledge base or corpus of electronic documents 107 or other data, semantic data 108, content creators, and/or users 130, and other possible sources of input. In selected embodiments, some or all of the inputs to knowledge manager 104 may be routed through the network 140 and/or the question prioritization system 110. The various computing devices (e.g., 150, 152, 154, 156, 158, 162) on the network 140 may include access points for content creators and/or users 130. Some of the computing devices may include devices for a database storing a corpus of data as the body of information used by the knowledge manager 104 to generate answers to questions. The network 140 may include local network connections and remote connections in various embodiments, such that knowledge manager 104 may operate in environments of any size, including local (e.g., a LAN) and global (e.g., the Internet). Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, a content creator 130 creates content (e.g., a document) in a knowledge base 106 for use as part of a corpus of data used in conjunction with knowledge manager 104. In selected embodiments, the knowledge base 106 may include any file, text, article, or source of data (e.g., scholarly articles, dictionary definitions, encyclopedia references, and the like) for use by the knowledge manager 104. Content users 130 may access the knowledge manager 104 via a network connection or an Internet connection to the network 140, and may input questions to the knowledge manager 104 that may be answered by the content in the corpus of data.

As further described below, when a process evaluates a given section of a document for semantic content, the process can use a variety of conventions to query it from the knowledge manager 104. One convention is to send a well-formed question. As used herein, semantic content broadly refers to content based upon the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager 104. In various embodiments, the knowledge manager 104 may interpret the question and provide a response to the content user containing one or more answers to the question. In some embodiments, the knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 119 and the language used in each of the portions of the corpus of data found during the application of the queries using a variety of reasoning algorithms. There may be hundreds or even thousands of reasoning algorithms applied, each of which performs different analysis (e.g., comparisons), and generates a score. For example, certain reasoning algorithms may look at the matching of terms and synonyms within the language of the input question and the found portions of the corpus of data. Other reasoning algorithms may look at temporal or spatial features in the language, while yet others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 120 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 150 to large mainframe systems, such as mainframe computer 158. Examples of handheld computer 150 include personal digital assistants (PDAs), personal entertainment devices, such as MP3 players, portable televisions, and compact disc players. Other examples of information processing systems include pen, or tablet, computer 152, laptop, or notebook, computer 154, personal computer system 156, server 162, and mainframe computer 158.

As shown, the various information processing systems can be networked together using computer network 140. Types of computer network 140 that can be used to interconnect the various information processing systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information processing systems.

Figure 2:
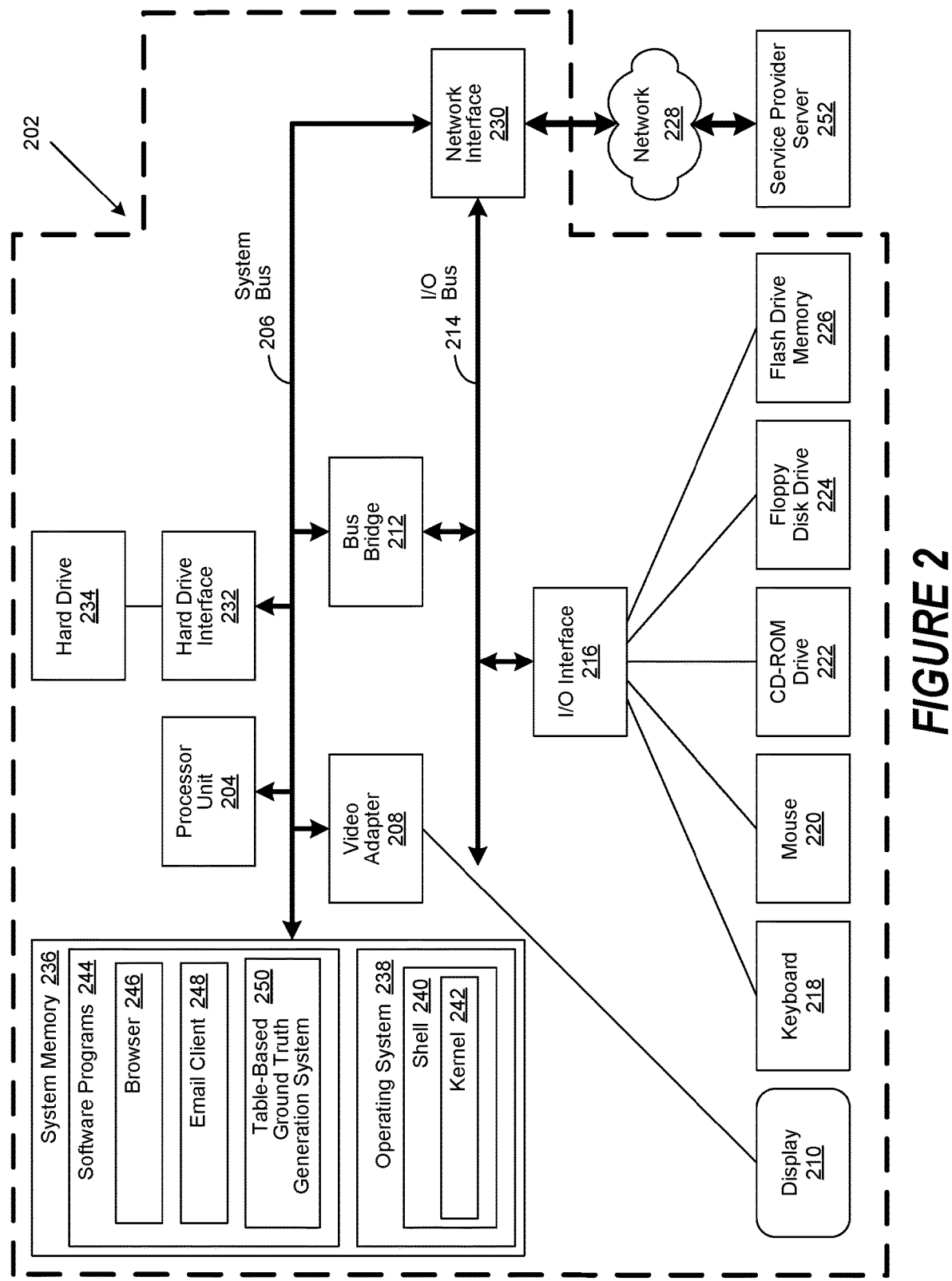
FIG. 2 is a simplified block diagram of an information handling system capable of performing computing operations.

In selected embodiments, the information processing systems include nonvolatile data stores, such as hard drives and/or nonvolatile memory. Some of the information processing systems may use separate nonvolatile data stores. For example, server 162 utilizes nonvolatile data store 164, and mainframe computer 158 utilizes nonvolatile data store 160. The nonvolatile data store can be a component that is external to the various information processing systems or can be internal to one of the information processing systems. An illustrative example of an information processing system showing an exemplary processor and various components commonly accessed by the processor is shown in FIG. 2.

In various embodiments, the QA system 100 is implemented to receive a variety of data from various computing devices (e.g., 150, 152, 154, 156, 158, 162) and data sources 166, which in turn is used to perform QA operations described in greater detail herein. In certain embodiments, the QA system 100 may receive a first set of information from a first computing device (e.g., laptop computer 154). The QA system 100 then uses the first set of data to perform QA processing operations resulting in the generation of a second set of data, which in turn is provided to a second computing device (e.g., server 162). In response, the second computing device may process the second set of data to generate a third set of data, which is then provided back to the QA system 100. In turn, the QA system may perform additional QA processing operations on the third set of data to generate a fourth set of data, which is then provided to the first computing device.

In certain embodiments, a first computing device (e.g., server 162) may receive a first set of data from the QA system 100, which is then processed and provided as a second set of data to another computing device (e.g., mainframe 158). The second set of data is processed by the second computing device to generate a third set of data, which is provided back to the first computing device. The second computing device then processes the third set of data to generate a fourth set of data, which is then provided to the QA system 100, where it is used to perform QA operations described in greater detail herein.

In one embodiment, the QA system may receive a first set of data from a first computing device (e.g., handheld computer/mobile device 150), which is then used to perform QA operations resulting in a second set of data. The second set of data is then provided back to the first computing device, where it is used to generate a third set of data. In turn, the third set of data is provided back to the QA system 100, which then provides it to a second computing device (e.g., mainframe computer 158), where it is used to perform post processing operations.

As an example, a content user 130 may ask the question, "I'm looking for a good pizza restaurant nearby." In response, the QA system 100 may provide a list of three such restaurants in a half mile radius of the content user. In turn, the content user 130 may then select one of the recommended restaurants and ask for directions, signifying their intent to proceed to the selected restaurant. In this example, the list of recommended restaurants, and the restaurant the content user 130 selected, would be the third set of data provided to the QA system 100. To continue the example, the QA system 100 may then provide the third set of data to the second computing device, where it would be processed to generate a database of the most popular restaurants, by classification, location, and other criteria.

In various embodiments the exchange of data between various computing devices (e.g., 150, 152, 154, 156, 158, 162) results in more efficient processing of data as each of the computing devices can be optimized for the types of data it processes. Likewise, the most appropriate data for a particular purpose can be sourced from the most suitable computing device (e.g., 150, 152, 154, 156, 158, 162), or data source 166, thereby increasing processing efficiency. Skilled practitioners of the art will realize that many such embodiments are possible. Accordingly, the foregoing is not intended to limit the spirit, scope or intent of the invention.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a table-based groundtruth generation system 250. In these and other embodiments, the table-based groundtruth generation system 250 includes code for implementing the processes described hereinbelow. In one embodiment, the information processing system 202 is able to download the table-based groundtruth generation system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
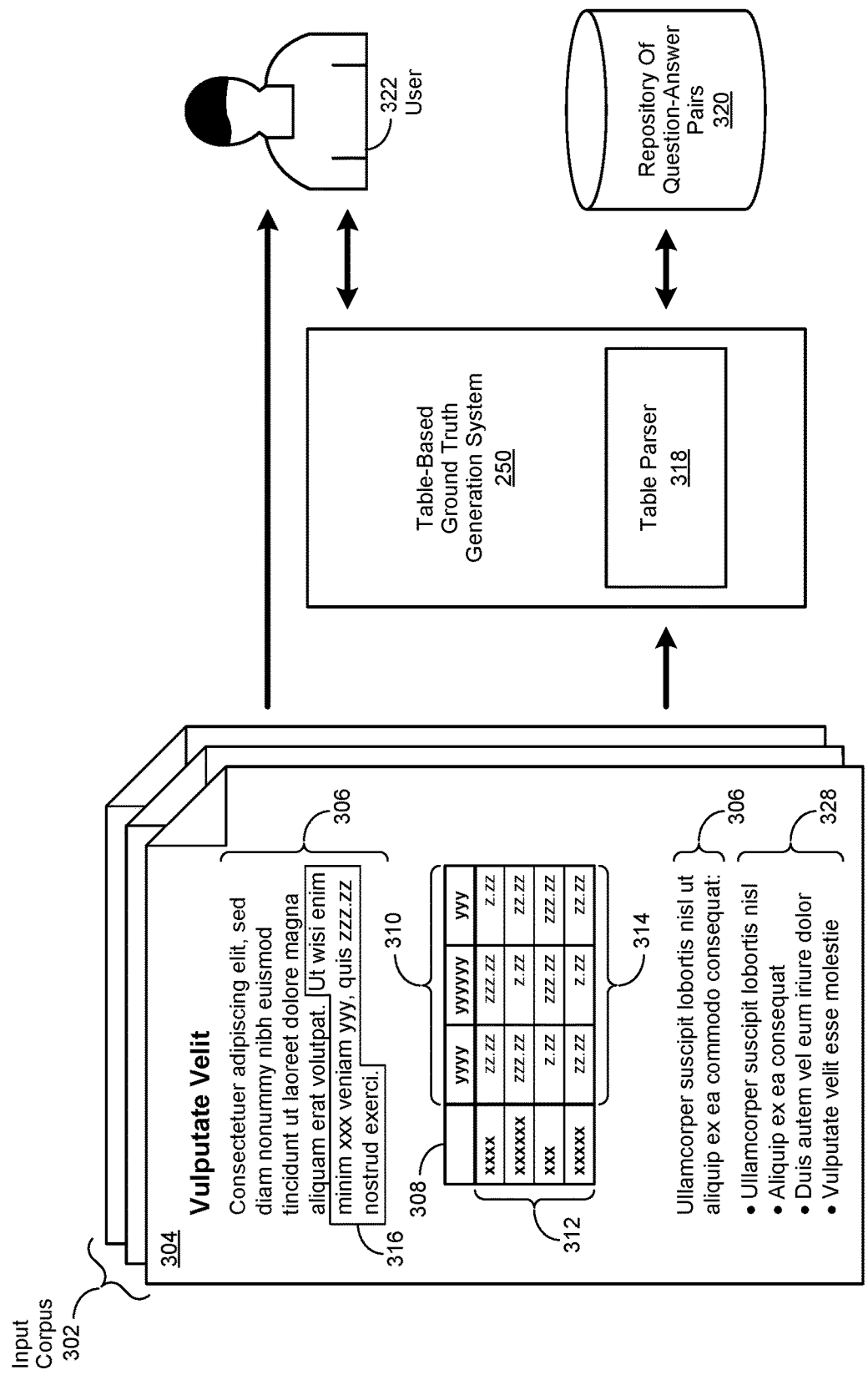
FIG. 3 is a simplified block diagram of a table-based groundtruth generation system.

FIG. 3 is a simplified block diagram of a table-based groundtruth generation system implemented in accordance with an embodiment of the invention. As used herein, groundtruth broadly refers to a set of question-answer (QA) pairs used to train a machine learning system, such as a QA system, where each question of an associated QA pair has a corresponding correct answer. As likewise used herein, supervised learning approaches broadly refer to various machine learning approaches for inferring a function from labeled training data, which typically consists of training examples. In these approaches, a QA system is provided example inputs consisting of labeled training data, and their desired outputs, with the goal of generating a general rule that can subsequently be used to associate a given input with a corresponding output.

In various embodiments, such training data is generated by domain experts, such as a user 322, that first create questions and then link them to one or more correct answers. In certain embodiments, the training data is automatically generated, as described in greater detail herein. In certain embodiments, the resulting QA pairs are then used for training the QA system.

As likewise used herein, a table broadly refers to a collection of structured data arranged in rows and columns, the intersections of which are commonly referred to as cells, which may or may not contain data. In various embodiments, each row or column associated with a table may have a corresponding label. In these embodiments, the label may be associated with a field, parameter, property, attribute, and so forth, which in turn may be represented by a word, phrase, or numerical index. In certain embodiments, a row may be a record, such as a database record.

In various embodiments, a table may be contained within a corpus of otherwise unstructured data, such as a human-readable text. In these embodiments, various columns, rows or cells of the table may be referenced within the unstructured data. In certain embodiments, a table may not be contained within a corpus of unstructured data, but referenced therein. As an example, a text document may contain references to various financial information stored in a table contained in a different text document, or alternatively, in a binary file such as a spreadsheet. Skilled practitioners of the art will recognize that many such embodiments and examples are possible. Accordingly, the foregoing is not intended to limit the spirit, scope or intent of the invention.

In various embodiments, an input corpus 302 of human-readable text includes one or more documents 304, which in turn may contain unstructured text 306, one or more tables 308, and one or more bullet lists 328. In certain embodiments, the table 308 may include column 310 labels, row 312 labels, associated cells 314 containing structured data, or some combination thereof. In one embodiment, structured data within a table 308, and its corresponding column 310 and row 312 labels, is processed by a table-based groundtruth generation system 250 to generate a QA pair.

In another embodiment, structured or unstructured data within a bullet list 328 is processed by the table-based groundtruth generation system 250 to generate a QA pair. However, skilled practitioners of the art will recognize that generating QA pairs from repeated-structure content, such as that commonly found in a table 308, may result in a plethora of questions that may not be of significant interest to a user 322. Accordingly, the resulting QA pairs generated from information within the table 308, or bullet list 328, are assigned a low initial ranking score, as described in greater detail herein.

In one embodiment, unstructured text 306 containing a reference to particular data in a table 308, the referenced data within the table 308, and its corresponding column 310 and row 312 labels are processed by the table-based groundtruth generation system 250 to generate a QA pair. In another embodiment, unstructured text 306 containing a reference to particular data in a bullet list 328, and the referenced data within the bullet list 328, is processed by the table-based groundtruth generation system 250 to generate a QA pair. In these embodiments, the resulting QA pair is assigned a relatively high ranking score as it would likely reference information that is of interest to a user 322.

In various embodiments, QA pairs are generated with the assistance of a user 322 interacting with a groundtruth generation system. In one embodiment, the user 322 references data within the table 308 to generate the QA pairs. In another embodiment, the user 322 references data within the bullet list 328 to generate the QA pairs. In various embodiments, the QA pairs are generated by a user 322 interacting with table-based groundtruth generation system 250. In certain of these embodiments, the table-based groundtruth generation system 250 may allow the user to enter a question and subsequently present a series of potential answers for the user 322 to use in the generation of a QA pair. In certain embodiments, when a user chooses a correct answer that is in a table or bullet list, a first QA pair is generated, where the question is the user's entered question and the answer is the user's chosen answer. In certain embodiments when a user chooses a correct answer that is in a table or bullet list, the groundtruth generation system may then automatically create additional QA pairs using the user-generated QA pair as a template, and applying that template to the table or bulleted list. The method by which the table-based groundtruth generation system 250 provides the questions, answers, or a combination thereof, to the user 322 and subsequently creates additional QA pairs is a matter of design choice.

Once these various QA pairs are generated by the table-based groundtruth generation system 250, they are assigned an associated ranking score, as described in greater detail herein, and then stored in a repository of QA pairs 320. In various embodiments, these QA pairs are then ranked according to their respective ranking scores. In certain embodiments, QA pairs generated by or with the assistance of the user 322 are used in ranking operations to determine the ranking of the QA pairs. In various embodiments, QA pairs generated by or with the assistance of the user 322 are assigned a particular ranking score, as likewise described in greater detail herein, to indicate their respective significance. In certain embodiments, the repository of QA pairs 320 may include a repository of user questions and/or QA pairs that aren't generated by the groundtruth-generation system 250. In certain embodiments, the user questions and/or QA pairs that are not generated by the groundtruth generation system 250 can be used to affect QA pair scores. Once ranked, the QA pairs are used as a groundtruth training set in supervised learning approaches to train a QA system. For example, the highest scored QA pairs, up to a desired number, can be chosen to train the system. Those of skill in the art will recognize that many such embodiments are possible. Accordingly the foregoing is not intended to limit the spirit, scope or intent of the invention.

Referring now to FIG. 3, table-based groundtruth generation operations are initiated in this embodiment by the receipt of an input corpus 302 of human-readable text, such as a collection of documents 304, by a table-based groundtruth generation system 250. A target document 304 within the input corpus 302 is selected, followed by the identification of any tables 308 it may contain. A target table 308 is selected and then processed to parse its associated column 310 and row 312 labels.

In various embodiments, the parsing is performed by a table parser 318. In certain embodiments, the table-based groundtruth generation system 250 includes the table parser 318. In one embodiment, the table parser 318 is an independent system. In another embodiment, the table parser 318 is part of another system, such as a QA system, described in greater detail herein. In yet another embodiment, the functionality of the table parser 318 is provided as a service delivered over a network connection. Skilled practitioners of the art will recognize that many such embodiments are possible. Accordingly, the foregoing is not intended to limit the spirit, scope or intent of the invention.

The type of content (e.g., numerical, categorical, percentage, date, time, etc.) associated with the column 310 and row 312 labels is then identified and assigned as metadata to each cell 314 within the table 308 (and to the corresponding column 310 and row 312 labels). In certain embodiments, the type of content associated with the column 310 and row 312 labels (and assigned as metadata) can also include keyword and entity information. Entries in the cells can be used to aid identification of the type of content. An entity is a category, such as "city." "New York" is a keyword and a specific example of the city entity. Questions for QA pairs are then automatically generated by applying direct statement templates to the contents of the table 308. As used herein, a direct statement broadly refers to a statement containing data that is directly stated within a document 304. In certain embodiments, the directly-stated data is contained in a table 308.

In various embodiments, use of the direct statement template automatically generates a question for a QA pair by combining words or phrases such as "who," "what," "when," "where," "how many," "what percentage," and so forth, with information contained in column 310 and row 312 labels. In certain embodiments, answers for the QA pairs are contained within one or more cells 314 of the table 308 respectively associated with their corresponding column 310 and row 312 labels. In these embodiments, a low initial ranking score (e.g., score=0.1) is assigned to each of the resulting QA pairs to signify their respective significance, as they are generated from direct statements associated with the contents of the table 308 and may not necessarily reflect typical end-user questions. The method by which the initial score is selected and assigned is a matter of design choice.

Unstructured text 306 in the selected document 304 is then processed to identify references to the column 310 and row 312 labels of the table 308. The initial ranking scores of the QA pairs previously generated through the use of direct templates, that are likewise associated with one or more of the identified references to column 310 and row 312 labels of the table 308, are then increased. In various embodiments, the ranking scores are increased by a greater amount if the references to the column 310 and row 312 labels in the unstructured text 306 are proximate to one another, such as in the same sentence 316. In these embodiments, the amount by which these ranking scores are increased is a matter of design choice.

Unstructured text 306 in the selected document 304 is then further processed to extract portions 316, such as a sentence, containing references to tables, such as direct references to tables (e.g., "as seen in Table 1, . . . "), to cells 314 (e.g., amounts, percentages, etc.) or column 310 labels or row 312 labels, such as groups, classifications, characteristics, keywords, entities and so forth. An extracted portion 316 of the unstructured text 306 is then selected, followed by a determination being made whether one or more QA pairs exist for the selected portion 316. If so, then they are referenced to the selected portion 316 of unstructured text 306. Otherwise, QA generation operations familiar to those of skill in the art are performed on the selected portion 316 of unstructured text 306 to generate one or more QA pairs.

The previously referenced or generated QA pairs, each of which contain a question whose answer is in the selected portion 316 of the unstructured text 306, are then assigned a high initial ranking score (e.g., score=1), as described in greater detail herein. These questions are then processed to extract any associated entities and keywords. In turn, the extracted entities and keywords are respectively mapped to their corresponding column 310 and row 312 labels. In various embodiments, the mapping operations are implemented to accommodate non-exact mapping of entities and keywords. For example, abbreviations of column 310 labels, row 312 labels, entities, keywords, or any combination thereof, may be mapped to one another. The method by which the mapping operations are implemented is a matter of design choice.

A QA pair generated from the referenced or generated QA pairs is then selected, followed by the selection of a question associated with the selected QA pair. In various embodiments, some or all identified entities and keywords in the selected question (e.g. question 'q') are then replaced with wildcards to generate a question template (e.g., TEMPLATE$_q$). The resulting question template is then applied to the table to create new questions by replacing the wildcards it contains with entities and keywords similar to those previously extracted. As an example, the entity "Male" may be replaced with a wildcard 'M', which in turn may be replaced with the word "Men." The method of determining which entities and keywords are similar to those replaced is a matter of design choice. Skilled practitioners of the art will recognize that many such examples and methods are possible. Accordingly, the foregoing is not intended to limit the spirit, scope or intent of the invention. The process is continued, question by question, QA pair by QA pair, until generation of additional QA pairs is concluded. The method by which it is decided to conclude generation of QA pairs is a matter of design choice. In an embodiment, the QA pairs generated using the created templates are assigned a lower initial score (e.g., score=0.5) than the QA pairs referenced to or generated from the extracted unstructured text.

Skilled practitioners of the art will recognize that in certain embodiments the assignment of higher ranking scores may be based upon a score generation methodology. In certain embodiments the score generation methodology may be based on one or more factors. More specifically, with a first score generation methodology the unstructured text 306 associated with a given QA pair may reference particular data contained in the table 308. Accordingly, referenced data contained in the table 308 is typically more relevant than that which is not referenced in the unstructured text 306 and thus should have an associated higher score. With a second score generation methodology, a QA pair based upon the unstructured text 306 is typically of more interest to a user than a QA pair whose associated groundtruth is solely based upon the contents of the table 308 and thus should have an associated higher score.

The scored QA pairs are then stored in a repository of QA pairs 320, followed by a determination being made whether to select another portion 316 of unstructured text 306. If so, the process is repeated, as described, until it is decided not to select another portion 316 of unstructured text 306. A determination is then made whether to select another table 308 within the selected document 304. If so, then the process is repeated, as described, until it is decided not to select another table 308 within the selected document 304.

Once all portions of unstructured text 316, tables 308, and documents 304 have been selected and processed as described, the QA pairs stored in the repository of QA pairs 320 are ranked according to their respective ranking scores. The ranked QA pairs are then used to train a QA system, as described in greater detail herein.

FIG. 4 is an exemplary table used in accordance with an embodiment of the invention for automating the generation of table-based groundtruth. In this embodiment, a document containing an exemplary table 400 is received by a table-based groundtruth generation system. Parsing operations are performed on the document to extract the table 400, followed by performing additional parsing operations on the extracted table 400 to parse its associated column 410 and row 412 labels. The type of content (e.g., numerical, categorical, percentage, date, time, keywords, entities, etc.) associated with the column 410 and row 412 labels is then identified and assigned as metadata to each cell 414 within the table 400 and to the column 410 and row 412 labels.

Questions for QA pairs are then automatically generated by applying direct statement templates, as described in greater detail herein, to the contents of the table 400. In various embodiments, use of the direct statement template automatically generates a question for a QA pair by combining words or phrases such as "who," "what," "when," "where," "how many," "what percentage," and so forth, with information contained in column 410 and row 412 labels. For example, based upon the contents of the table 400 shown in FIG. 4, such questions may include:

"What is the mean Age of subjects in the Control (C) group?"

"What is the mean Age of subjects in the Psoriatic (P) group?"

"How many Male subjects are in the Control (C) group?"

"How many Male subjects are in the Psoriatic (P) group?"

"How many White subjects are in the Mild Psoriasis (MP) group?"

"How many Hispanic subjects are in the Severe Psoriasis (SP) group?"

In certain embodiments, answers for the QA pairs are contained within one or more cells 414 of the table 400 respectively associated with their corresponding column 410 and row 412 labels. To continue the preceding example, such answers may include:

"The mean Age of subjects in the Control (C) group is 11.5."

"The mean Age of subjects in the Psoriatic (P) group is 12.2."

"There are 96 Male subjects are in the Control (C) group."

"There are 178 Male subjects are in the Psoriatic (P) group."

"There are 134 White subjects are in the Mild Psoriasis (MP) group."

"There are 26 Hispanic subjects are in the Severe Psoriasis (SP) group."

A low initial ranking score (e.g., score=0.1) is then assigned to each of the resulting QA pairs to signify their respective significance, as they are generated from direct statements associated with the contents of the table 400 and may not necessarily reflect typical end-user questions. Unstructured text within the document associated with the table 400 is then processed to identify references to its column 410 and row 412 labels. The initial ranking scores of the QA pairs previously generated through the use of direct templates, that are likewise associated with one or more of the identified references to column 410 and row 412 labels of the table 400, are then increased as described in greater detail. For example, in an embodiment a sentence in the unstructured text, "Mild Psoriasis (MP) sufferers are frequently misdiagnosed" would cause the score for the QA pair including the question "How many White subjects are in the Mild Psoriasis (MP) group?" to have its score increased, since that QA pair is associated with a column label including "MP." As another example, "Hispanic" and "White" could be recognized as examples of the entity "ethnicity." The metadata associated with the row 412 labels containing "Hispanic" and "White" in the table 400 could include entity ethnicity. In an embodiment, unstructured text stating "Ethnicity is studied" could then cause the questions "How many White subjects are in the Mild Psoriasis (MP) group?" and "How many Hispanic subjects are in the Severe Psoriasis (SP) group?" to have their scores increased based on their associated row labels being recognized as examples of the entity ethnicity.

Unstructured text within the document is then further processed to extract portions, such as a sentence, that contain references to the contents of the table 400. Continuing the preceding example, a portion of the unstructured text (not shown) may state:

"More SP than MP children had family history of obesity (24.7% of MP and 33.9% of SP)"

An extracted portion of the unstructured text is then selected, followed by a determination being made whether one or more QA pairs exists for it, e.g., in a database of QA pairs, which may have been created by logging user queries during use of this or a similar QA system or created by a subject matter expert. If so, then they are referenced to the selected portion of unstructured text. Otherwise, QA generation operations familiar to those of skill in the art are performed on the selected portion of unstructured text to generate one or more QA pairs, each of which contains a question whose answer is in the selected portion of the unstructured text. In continuance of the preceding example:

Question: "How does family history of obesity vary in SP versus MP children?"

Answer: "More SP (33.9%) than MP (24.7%) children have family history of obesity."

A high initial ranking score is assigned (e.g., score=1). The high ranking score reflects the fact that information called out in the unstructured text is likely to be of interest to users. The resulting questions are then processed to extract any associated entities and keywords, which are in turn respectively mapped to their corresponding column 410 and row 412 labels and templates are created which are used to automatically generate questions. For example, C, P, MP and SP are recognized as keywords corresponding to the entity population and "family history of obesity" is recognized as a keyword. A template "How does 'family history of obesity' vary in <population1> versus <population2>" is created and, the following additional QA pair can be automatically generated from the contents of the table 400 shown in FIG. 4 (it will be appreciated that answers may be simple answers from one or more cells or answers generated from an answer template):

Question: "How does family history of obesity vary in Control children versus Psoriatic?"

Answer: "More Control (30.4%) than Psoriatic (29.6%) children have family history of obesity."

In various embodiments, the mapping operations are implemented to accommodate non-exact mapping of entities and keywords. For example, abbreviations of column 410 labels, row 412 labels, entities, keywords, or any combination thereof, may be mapped to one another. A lower initial ranking score (e.g., score=0.5) is then assigned to each QA pair generated using a template that is based on a question referenced to or created from the extracted portion of unstructured text. Skilled practitioners of the art will recognize that many such examples, methods and embodiments are possible. Accordingly, the foregoing is not intended to limit the spirit, scope or intent of the invention.

Figure 5A:
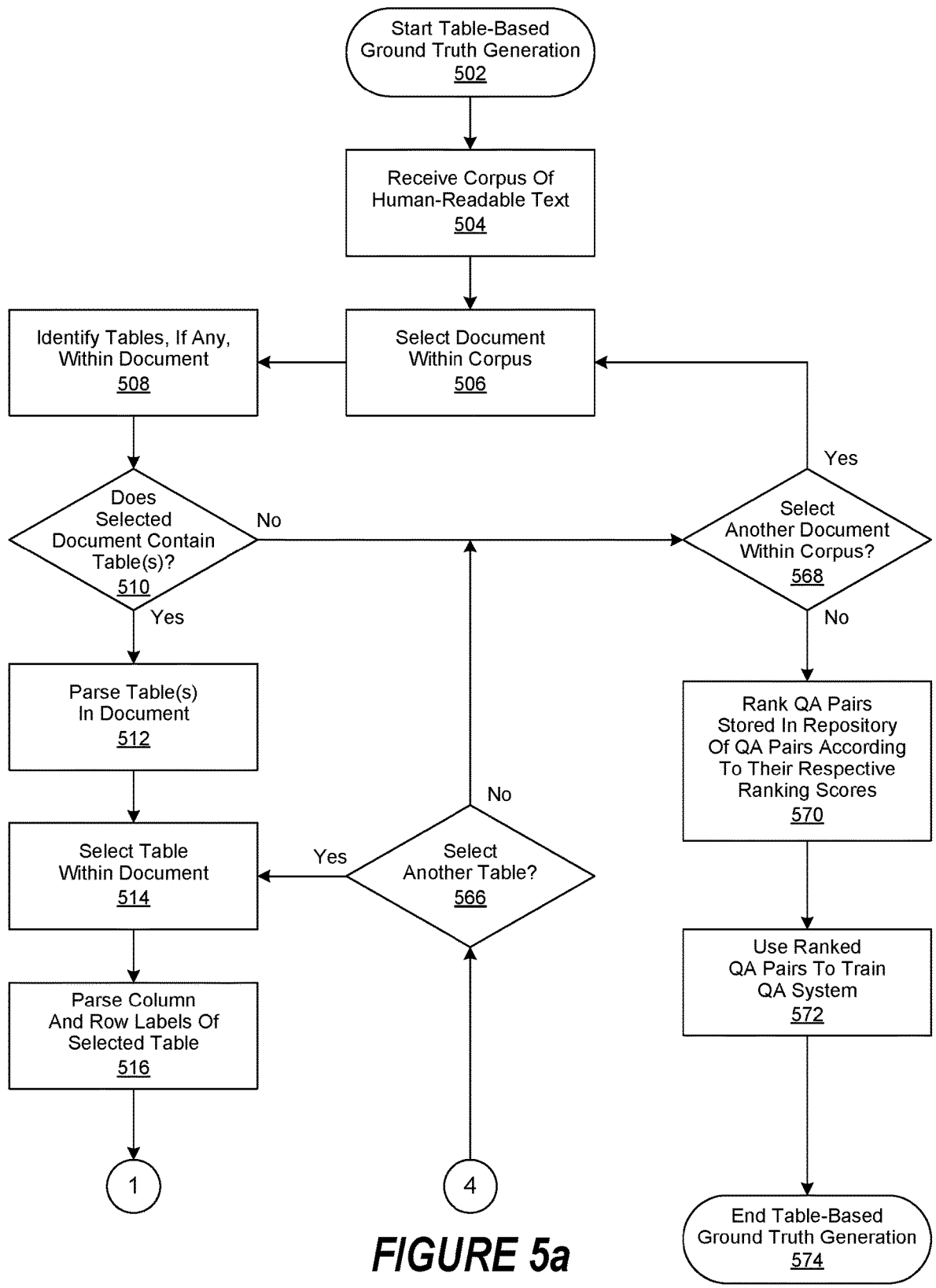
FIGS. 5a through 5c are a generalized flowchart of the performance of table-based groundtruth generation operations.
Figure 5B:
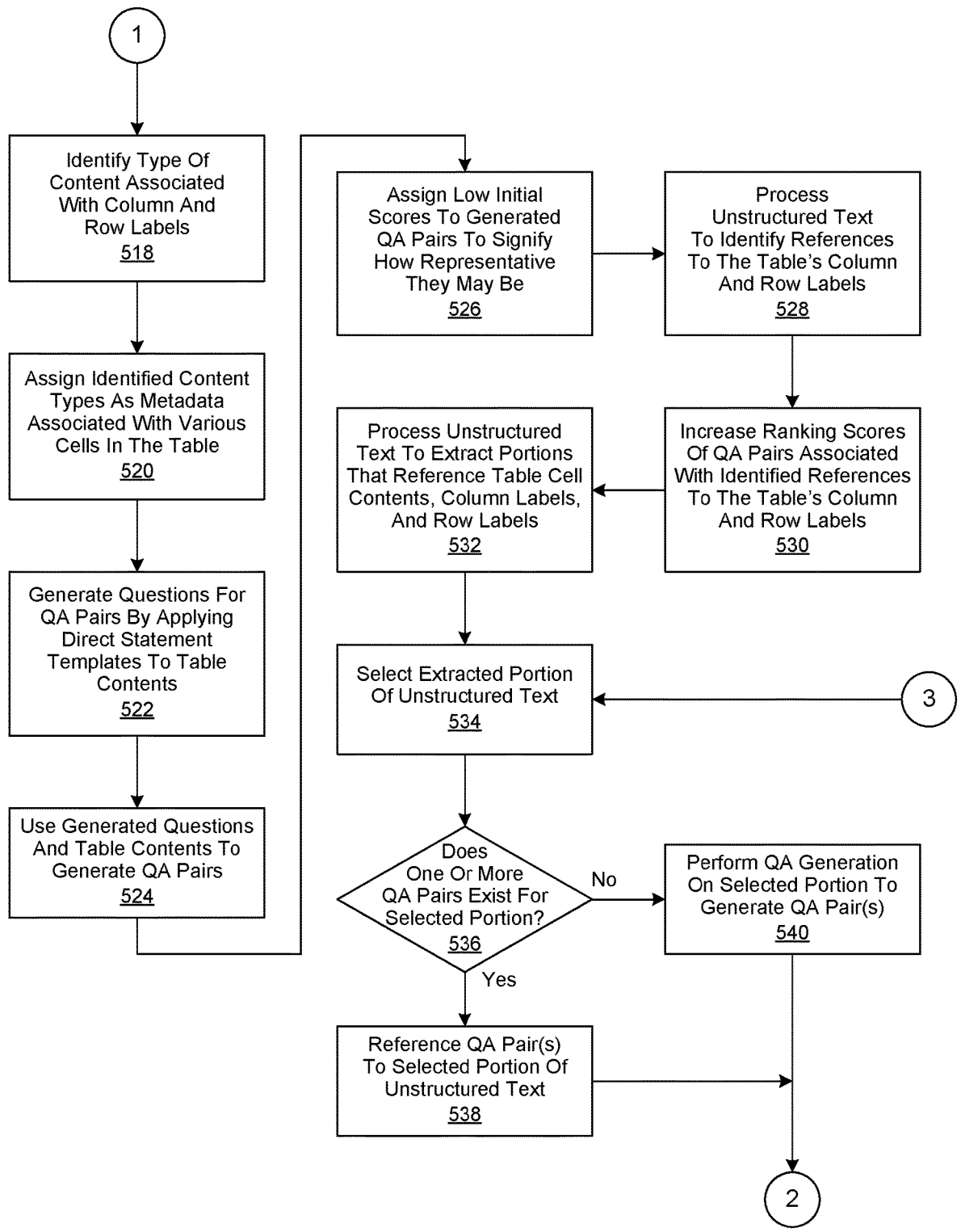
Figure 5C:
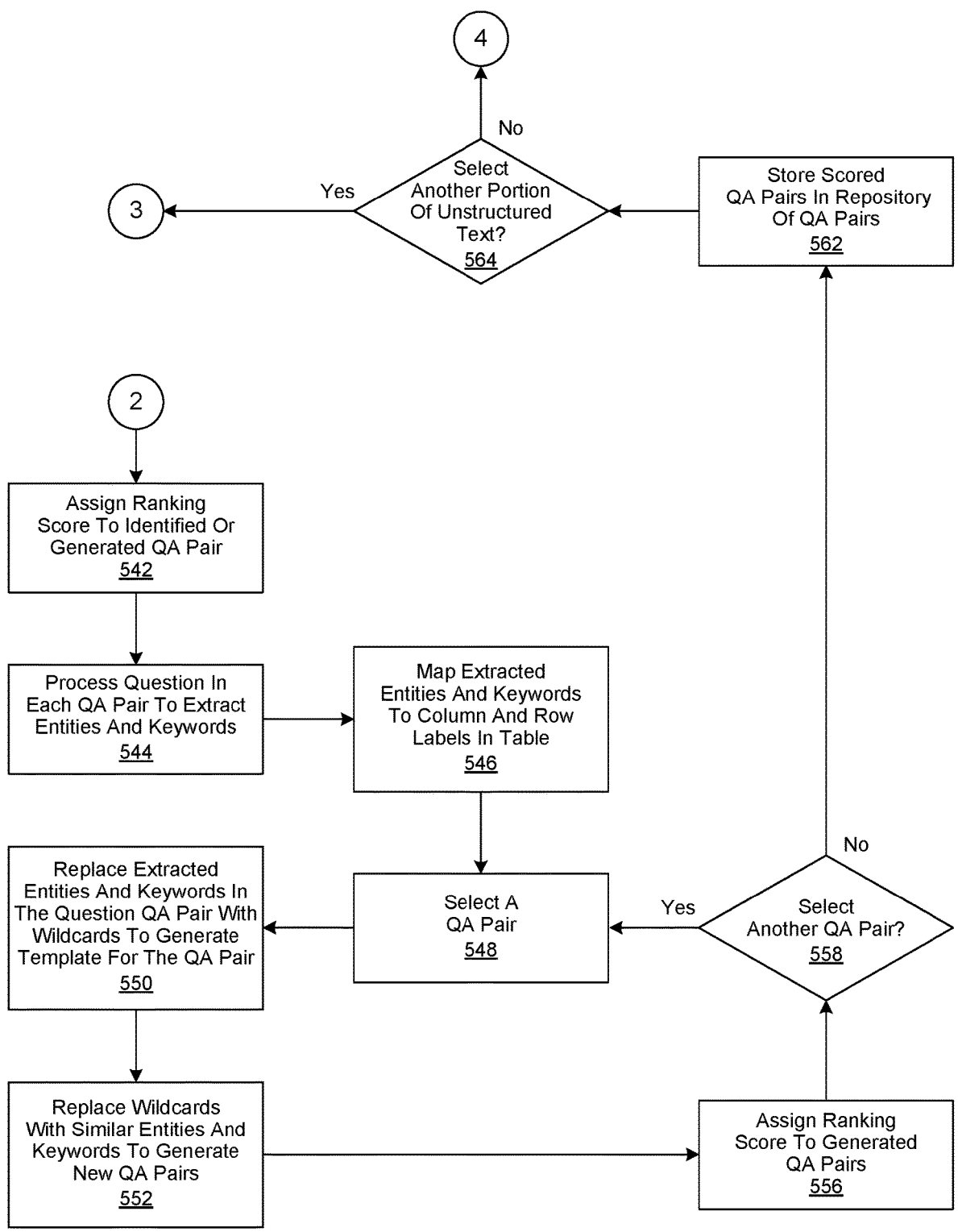

FIGS. 5a through 5c are a generalized flowchart of the performance of table-based groundtruth generation operations implemented in accordance with an embodiment of the invention. In this embodiment, table-based groundtruth generation operations are begun in step 502, followed by the receipt of a corpus of human-readable text, such as a collection of documents, in step 504. A target document within the corpus is selected in step 506, followed by the identification of any tables it may contain in step 508. A determination is then made in step 510 whether the document contains one or more tables.

If so, then the document is processed in step 512 to parse any tables it may contain, followed by the selection of a target table in step 514. The selected table is then processed in step 516 to parse its associated column and row labels. In turn, the type of content (e.g., numerical, categorical, percentage, date, time, keywords, entities, etc.) associated with each of the parsed column and row labels, individually or in combination, is identified in step 518 and then assigned in step 520 as metadata to each cell within the table.

Questions for question-answer (QA) pairs are then automatically generated in step 522 by applying direct statement templates to the contents of the table. The resulting questions, the row/column label data associated with the table, and the contents of the table's cells are then processed in step 524 to generate associated QA pairs. A low initial score (e.g., score=0.1) is then assigned in step 526 to each of the resulting QA pairs to signify their respective significance, as they are generated from direct statements associated with the contents of the table and may not necessarily reflect typical end-user questions.

Unstructured text in the selected document is then processed in step 528 to identify references to the table's column and row labels. The ranking scores of QA pairs generated in step 524, that are likewise associated with one or more of the identified references to the table's column and row labels, are then increased in step 530, as described in greater detail herein. In various embodiments, the scores are increased by a greater amount if the references to the column and row labels in the unstructured text are proximate to one another, such as in the same sentence.

Unstructured text in the selected document is then further processed in step 532 to extract portions that contain references to a table, such as the table 400 shown in FIG. 4. In certain embodiments, the references to a table may include the contents of individual cells, column labels, row labels, associated metadata, or any combination thereof. An extracted portion of the unstructured text is then selected in step 534, followed by a determination being made in step 536 whether one or more QA pairs exist for the selected portion. If so, then they are referenced to the selected portion of unstructured text in step 538. Otherwise, QA generation operations familiar to those of skill in the art are performed in step 540 on the selected portion of unstructured text, the contents of the cell it references, and the cell's associated column and row labels, to generate one or more QA pairs. In various embodiments, the selected portion of unstructured text contains the answer associated with certain of the QA pairs referenced in step 538 or generated in step 540.

The QA pairs referenced in step 538, or generated in step 540, are then assigned a ranking score in step 542, as described in greater detail herein, according to indicators of user interest. In turn, the QA pairs referenced in step 538, or generated in step 540 are then processed in step 544 to extract any associated entities and keywords. The extracted entities and keywords are then respectively mapped to their corresponding column and row labels in step 546.

Then, in step 548, a QA pair referenced in step 538, or generated in step 540, is selected, followed by replacing identified entities and keywords in the selected QA pair with wildcards in step 550 to generate a template for the selected QA pair. The resulting template is then used in step 552 to create new QA pairs by replacing the wildcards it contains with entities and keywords similar to those extracted in step 544. The QA pairs resulting are then assigned a ranking score in step 556, as described in greater detail herein.

A determination is then made in step 558 whether to select another QA pair. If so, then the process is continued, proceeding with step 548. If not, then, in step 562, the scored QA pairs are stored in a repository of QA pairs, followed by a determination being made in step 564 whether to select another portion of unstructured text. If so, the process is continued, proceeding with step 534. Otherwise, a determination is made in step 566 whether to select another table. If so, then the process is continued, proceeding with step 514.

Otherwise, or if it was determined in step 510 that the selected document does not contain one or more tables, then a determination is made in step 568 whether to select another document in the corpus. If so, the process is continued, proceeding with step 506. Otherwise, the QA pairs stored in the repository of QA pairs are ranked in step 570 according to their respective ranking scores. The ranked QA pairs are then used in step 572 to train a QA system, as described in greater detail herein, and table-based groundtruth generation operations are ended in step 574.

Although the present invention has been described in detail, it should be understood that various changes, substitutions and alterations can be made hereto without departing from the spirit and scope of the invention as defined by the appended claims.

For example, in various embodiments, the ranking score assigned to a given QA pair may be adjusted to reflect its significance to a user 322 of the QA system being trained. For example, in certain embodiments, the ranking score is increased by a first amount (e.g., +2) if a given term (e.g., "psoriasis") in the unstructured text 306 is used in either the question or answer of a corresponding QA pair. In another embodiment, the ranking score is increased by a second amount (e.g., +1) if an associated concept (e.g., "abnormal skin condition") in the unstructured text 306 is referenced in either the question or answer of a corresponding QA pair. For example, if the QA pair contains the term "psoriasis" and the unstructured text contains the term "abnormal skin condition", the QA pair's score would be increased by this amount. If there are multiple instances in the unstructured text of a given term or concept used or referenced in a QA pair, the QA pair's score can be increased for just the first occurrence or repeatedly for multiple occurrences. In various embodiments, the scoring strategies can be applied to table-based questions that are generated in any way, e.g., generating strategies as disclosed herein and/or using known generating strategies. In certain embodiments, the scoring strategies may also be applied to questions or QA pairs generated by a user who does not know well what users of the QA system being trained will be likely to ask.

In yet another embodiment, the ranking score is increased by another amount (e.g., +existing_score^proximity_measure) if two or more given terms (e.g., "psoriasis" and "dermatitis") appear in the unstructured text and are used in either the question or answer of a corresponding QA pair. In this embodiment, the value of the proximity_measure is a measure of how proximate the given terms are to each other in the unstructured text, such as in the same sentence 316. The method by which the value of the proximity_measure is determined in this embodiment is a matter of design choice. In yet still another embodiment, the ranking score is increased by another amount (e.g., +3) if a given term (e.g., "psoriasis"), or an associated concept (e.g., "skin disorder"), in the QA pair is referenced in a query submitted by a user 322 of the QA system. In certain embodiments, queries submitted by a user of the QA system may be stored in a database of user queries that may have been collected, during use of the QA system or a similar QA system.

In one embodiment, the ranking score is increased by another amount (e.g., +existing_score*8) if the corresponding QA pair is derived from unstructured text 306 that references the table 308, one or more column 310 labels, one or more row 312 labels, one or more table cells 314, or any combination thereof. In certain embodiments, if the question has already been assigned a high score, the ranking score would not necessary be increased. In another embodiment, the ranking score is increased by another amount (e.g., +existing_score*10) if the question associated with corresponding QA pair contains a query, or portion thereof, submitted by a user 322. In yet another embodiment, the ranking score is increased by another amount (e.g., +existing_score*5) if the question associated with a corresponding QA pair is derived from a question submitted by a user 322 of the QA system. In certain embodiments, queries submitted by a user of the QA system may be stored in a database of user queries that may have been collected, during use of the QA system or a similar QA system.

In yet still another embodiment, the ranking score is increased by another amount (e.g., +2) if the question refers to a relationship (e.g., population 'x' has a larger incidence than population 'y') that is detected in the unstructured text 306 that references the table 308, one or more column 310 labels, one or more row 312 labels, one or more table cells 314, or any combination thereof. In certain embodiments, the assignment of higher ranking scores can be based on one or more of a plurality of factors. For example, the factors may take into consideration data in a QA pair that is referenced in a user query as this data is typically more relevant than data that is not. Also for example data that is referenced in a question a user inputs to a groundtruth generation system is typically more relevant that data that is not. Also, factors may take into consideration subtleties such as when unstructured text references are in close proximity to one another are more indicative of user interest than distant ones, etc. In these embodiments, the amount by which a ranking score is adjusted, and the method by which the amount is determined, is a matter of design choice.

Those of skill in the art will recognize that many such embodiments are possible. Accordingly, the foregoing is not intended to limit the spirit, scope or intent of the invention.

What is claimed is:

1. A computer-implemented method for using table-based groundtruth to train a question-answer (QA) system, comprising:

receiving a corpus of text comprising unstructured text and a table, the table comprising quantitative information in a tabular format, the unstructured text comprising a reference to particular data in the table, the table comprising referenced data, the referenced data corresponding to the reference to particular data in the unstructured text;

parsing the table, the parsing identifying column labels and row labels of the table, the parsing also identifying a type of content associated with the column labels and the row labels of the table;

performing QA pair generation operations on the table to generate QA pairs, the QA pairs being based upon information obtained from the table, the information obtained from the table comprising table content, the table content comprising the column labels, row labels and the type of content associated with the column labels and the row labels, the QA pair generation operations generating questions by applying a template to the table content, the template comprising a direct statement template, the direct statement template comprising a statement containing data that is directly stated within the corpus of text;

assigning a score to each QA pair to provide QA scored pairs, the score corresponding to an indicator of user interest, the indicator of user interest taking into account whether information from the table used to generate the QA pair comprises referenced data, the score for each QA pair comprising a ranking score for each QA pair;

identifying groundtruth QA pairs based upon the ranking score of each QA pair; and, training the QA system using the scored QA pairs as table-based groundtruth, the table-based groundtruth comprising a set of table-based question-answer pairs, each question of an associated QA pair having a corresponding known correct answer, the scored QA pairs being used to perform supervised learning, the supervised learning comprising a machine learning approach for inferring a function from the scored QA pairs, the supervised learning using the scored QA pairs to generate a general rule to be used to associate a given input with a corresponding output; and wherein the score for an individual QA pair is increased when at least one of a plurality of conditions is met, the plurality of conditions comprising if a given term in the QA pair is used in the unstructured text, if a concept associated with a given term in the QA pair is referenced in the unstructured text, if the QA pair is derived from unstructured text that references at least one of a table, column label data, row label data, and a table cell, and if a question of a QA pair refers to a relationship that is detected in the unstructured text that references at least one of a table, column label data, row label data, and a table cell.

2. A system comprising:

a processor;

a data bus coupled to the processor; and a computer-usable medium embodying computer program code, the computer-usable medium being coupled to the data bus, the computer program code used for using table-based groundtruth to train a question-answer (QA) system and comprising instructions executable by the processor and configured for:

receiving a corpus of text comprising unstructured text and a table, the table comprising quantitative information in a tabular format, the unstructured text comprising a reference to particular data in the table, the table comprising referenced data, the referenced data corresponding to the reference to particular data in the unstructured text;

parsing the table, the parsing identifying column labels and row labels of the table, the parsing also identifying a type of content associated with the column labels and the row labels of the table;

performing QA pair generation operations on the table to generate QA pairs, the QA pairs being based upon information obtained from the table, the information obtained from the table comprising table content, the table content comprising the column labels, row labels and the type of content associated with the column labels and the row labels, the QA pair generation operations generating questions by applying a template to the table content, the template comprising a direct statement template, the direct statement template comprising a statement containing data that is directly stated within the corpus of text;

assigning a score to each QA pair to provide QA scored pairs, the score corresponding to an indicator of user interest, the indicator of user interest taking into account whether information from the table used to generate the QA pair comprises referenced data, the score for each QA pair comprising a ranking score for each QA pair;

identifying groundtruth QA pairs based upon the ranking score of each QA pair; and, training the QA system using the scored QA pairs as table-based groundtruth, the table-based groundtruth comprising a set of table-based question-answer pairs, each question of an associated QA pair having a corresponding known correct answer, the scored QA pairs being used to perform supervised learning, the supervised learning comprising a machine learning approach for inferring a function from the scored QA pairs, the supervised learning using the scored QA pairs to generate a general rule to be used to associate a given input with a corresponding output; and wherein the score for an individual QA pair is increased when at least one of a plurality of conditions is met, the plurality of conditions comprising if a given term in the QA pair is used in the unstructured text, if a concept associated with a given term in the QA pair is referenced in the unstructured text, if the QA pair is derived from unstructured text that references at least one of a table, column label data, row label data, and a table cell, and if a question of a QA pair refers to a relationship that is detected in the unstructured text that references at least one of a table, column label data, row label data, and a table cell.

3. A non-transitory, computer-readable storage medium embodying computer program code, the computer program code comprising computer executable instructions configured for:

receiving a corpus of text comprising unstructured text and a table, the table comprising quantitative information in a tabular format, the unstructured text comprising a reference to particular data in the table, the table comprising referenced data, the referenced data corresponding to the reference to particular data in the unstructured text;

parsing the table, the parsing identifying column labels and row labels of the table, the parsing also identifying a type of content associated with the column labels and the row labels of the table;

performing QA pair generation operations on the table to generate QA pairs, the QA pairs being based upon information obtained from the table, the information obtained from the table comprising table content, the table content comprising the column labels, row labels and the type of content associated with the column labels and the row labels, the QA pair generation operations generating questions by applying a template to the table content, the template comprising a direct statement template, the direct statement template comprising a statement containing data that is directly stated within the corpus of text;

assigning a score to each QA pair to provide QA scored pairs, the score corresponding to an indicator of user interest, the indicator of user interest taking into account whether information from the table used to generate the QA pair comprises referenced data, the score for each QA pair comprising a ranking score for each QA pair;

identifying groundtruth QA pairs based upon the ranking score of each QA pair; and, training the QA system using the scored QA pairs as table-based groundtruth, the table-based groundtruth comprising a set of table-based question-answer pairs, each question of an associated QA pair having a corresponding known correct answer, the scored QA pairs being used to perform supervised learning, the supervised learning comprising a machine learning approach for inferring a function from the scored QA pairs, the supervised learning using the scored QA pairs to generate a general rule to be used to associate a given input with a corresponding output; and wherein the score for an individual QA pair is increased when at least one of a plurality of conditions is met, the plurality of conditions comprising if a given term in the QA pair is used in the unstructured text, if a concept associated with a given term in the QA pair is referenced in the unstructured text, if the QA pair is derived from unstructured text that references at least one of a table, column label data, row label data, and a table cell, and if a question of a QA pair refers to a relationship that is detected in the unstructured text that references at least one of a table, column label data, row label data, and a table cell.

4. The non-transitory, computer-readable storage medium of claim 3, wherein the computer executable instructions are deployable to a client system from a server system at a remote location.

5. The non-transitory, computer-readable storage medium of claim 3, wherein the computer executable instructions are provided by a service provider to a user on an on-demand basis.

* * * * *